United States Patent
Chang et al.

(10) Patent No.: US 6,723,268 B2
(45) Date of Patent: Apr. 20, 2004

(54) METHOD OF MANUFACTURING OCHEROUS PANELS FOR USE AS AN INTERIOR BUILDING MATERIAL

(75) Inventors: Jae Seon Chang, Kwangyok (KR); Myung Ja Chun, Kwangyok (KR)

(73) Assignee: O.P. Tech Co., Ltd., Jeonranam-do (KR)

(*) Notice: Subject to any disclaimer, the term of this patent is extended or adjusted under 35 U.S.C. 154(b) by 0 days.

(21) Appl. No.: 10/229,671

(22) Filed: Aug. 27, 2002

(65) Prior Publication Data

US 2003/0046896 A1 Mar. 13, 2003

(30) Foreign Application Priority Data

Sep. 7, 2001 (KR) ......................................... 2001-55147

(51) Int. Cl.$^7$ ............................................... B29C 71/00
(52) U.S. Cl. ....................................... 264/234; 264/294
(58) Field of Search ................................ 264/234, 294

(56) References Cited

FOREIGN PATENT DOCUMENTS

JP          50161520       * 12/1975

* cited by examiner

*Primary Examiner*—Paul Marcantoni
(74) *Attorney, Agent, or Firm*—Jones Day

(57) ABSTRACT

The present invention relates to a method of manufacturing an ocherous panel for use as an interior building material that has excellent insulating properties and that is superior to conventional building materials such as cement, concrete, rock wool and soundproofing boards in strength, fire resistance and soundproofing, and interior aesthetic appeal. The method according to the present invention is characterized in that it uses about 45 wt % of ocher, about 45 wt % of sawdust and about 10 wt % of sodium silicate liquid instead of the composition that was used in the prior art which caused contamination of the air and decomposition of the panel due to absorption of moisture in the air.

9 Claims, No Drawings

METHOD OF MANUFACTURING OCHEROUS PANELS FOR USE AS AN INTERIOR BUILDING MATERIAL

FIELD OF THE INVENTION

The present invention relates to a method of manufacturing an ocherous panel for use as an interior building material, and more particularly, to a method of manufacturing a panel made of ocher that has excellent insulating properties and emission of far infrared ray, and that is superior to conventional building materials such as cement, concrete, rock wool and soundproofing boards in strength, fire resistance, soundproofing, and interior aesthetic appeal.

BACKGROUND OF THE INVENTION

Conventionally, in the construction of walls or ceilings, polystyrene foam, PE (polyethylene) film or finishing mortar has been used as an insulation material, and soundproofing board, rock wool or glass wool has been commonly used as a buffering material.

These materials have been used in the past mainly for insulation or soundproofing, but they have been used without due consideration of the environmental problems caused by their disposal and their harmfulness to the human body. Thus, there is a need for a new building material that is not harmful to humans and that also does not cause environmental problems.

In this regard, there have been attempts to develop a panel comprised of ocher, which is obtained from nature, is not known to cause harm to the human body, and does not contribute to environmental pollution.

A conventional method for manufacturing an ocherous panel is described in Korean Patent No. 191272, dated Jan. 23, 1999 and entitled "method of manufacturing an ocherous panel for building construction." In this method, an ocherous panel is manufactured by mixing together 68 wt % of carefully selected ocher, 30 wt % of waste pulp and 2 wt % of size (liquid paste) as a crosslink agent; adding 20 wt % of water to the mixture and kneading the total mixture in a pug mill; extruding the mixture through rollers to form a flat panel of a predetermined thickness; and curing the panel in a hot blast conveyor at a temperature of 80 to 150° C. for about 2 hours.

Unfortunately, the ocherous panel manufactured by this conventional method has disadvantages in that when it absorbs more than 30% moisture, the size contained therein reacts with microorganisms in the air and decomposes, thus contaminating the room air, and also in that the panel distorts when it is cured in the hot blast conveyor.

SUMMARY OF THE INVENTION

Accordingly, an object of the present invention is to provide a new method of manufacturing an ocherous panel for use as an interior building material that substantially eliminates the limitations and disadvantages of the prior art.

Another object of the present invention is to provide a method for manufacturing an ocherous panel which exhibits superior strength, heat resistance, insulating properties, and soundproofing in comparison with conventional materials used for walls and ceilings. The invention is also suitable for use as an interior decoration because it can be formed in a variety of shapes, such as a plane, a curved surface, or a refracted surface, for instance, depending on the shape of the mold used.

Another object of the present invention is to provide a manufacturing method for an ocherous panel where the panel does not decompose due to the absorption of moisture and is not distorted or transformed when it is exposed to heat.

Another object of the present invention is to provide a method of manufacturing an ocherous panel in which one side of the panel is vitrified to provide a protective layer on the side of the panel and thereby prevent contamination or scarring of the panel's surface.

A further object of the present invention is to provide an ocherous panel for use as an interior building material that has excellent insulating properties and emission of far infrared ray.

DETAILED DESCRIPTION OF THE PREFERRED EMBODIMENTS

Reference will now be made in detail to preferred embodiments of the present invention. The advantages and objects of the present invention can be achieved by a method of manufacturing an ocherous panel comprising the steps of: mixing about 45% by weight of ocher particles preferably having about 40 to about 50% moisture content and preferably having a particle size of about 0.5 mm or less, about 45% by weight of sawdust preferably having about 40 to about 50% moisture content and preferably having a particle size of about 0.5 mm×5 mm, and about 10% by weight of sodium silicate liquid, preferably in a vertical mixer; extruding the mixture preferably through a pug mill; heating both sides of a press to a temperature of about 200 to about 500° C.; compression molding the mixture with the press; and curing the molded mixture preferably for about 2 or 3 seconds. The addition of sodium silicate liquid as a crosslink agent results in a panel that does not decompose due to the absorption of moisture and does not distort when exposed to heat.

The resulting ocherous panel is yellowish brown or ocher color. One test sample was produced with a thickness of 15 mm, 0.9% of moisture content (Test method: KSF 3504-96), and 1275N of bending and breaking load (Test method: KSF 2263-71).

According to another embodiment of the present invention, a method of manufacturing an ocherous panel for use as interior building material comprises the steps of: mixing about 45% by weight of ocher particles preferably having about 40 to about 50% moisture content and preferably having a particle size of about 0.5 mm or less, about 45% by weight of sawdust preferably having about 40 to about 50% moisture content and preferably having a particle size of about 0.5 mm×5 mm, and about 10% by weight of sodium silicate liquid preferably in a vertical mixer; extruding the mixture preferably through a pug mill; heating one side of a press to a temperature of 200 to 500° C.; compression molding the mixture with the press, and curing the molded mixture preferably for about 2 or 3 seconds. The non-heated side of the panel is then vitrified.

The resulting ocherous panel has one side of a yellowish brown or ocher color and the non-heated side is vitrified to prevent contamination or scarring of the surface of the panel Table 1 shows the difference in physical properties of the ocherous panels according to the above embodiments and the conventional ocher panel.

TABLE 1

|  | Strength | Fire proof | Soundproof | Interior decoration effect | Scarring prevention effect |
| --- | --- | --- | --- | --- | --- |
| Conventional ocher panel | O | Y | O | Y | X |
| Embodiment 1 | O | O | O | O | Y |
| Embodiment 2 | O | O | O | O | O |

X: poor
Y: average
O: excellent

The ocherous panel manufactured according to the present invention is superior to conventional ocher panel or polystyrene foam panel in strength, heat resistance, insulating properties, soundproofing, aesthetic appeal and scarring prevention so that residents in houses built with such an ocherous panel can enjoy more pleasant and safe living.

Also, since the present invention does not use size, but uses sodium silicate liquid as a crosslink agent, the ocherous panel according to the present invention rarely absorbs moisture in the air even in the summer season with high humidity, so that the contamination of room air can be prevented.

It will be apparent to those skilled in the art that various modifications and variations can be made to the method of the present invention without departing from the spirit and scope of the invention. The scope of the present invention is accordingly defined as set forth in the appended claims.

What is claimed is:

1. A method of manufacturing an ocherous panel for use as an interior building material comprising the steps of:

mixing about 45% by weight of ocher particles having about 40 to about 50% moisture content and a particle size of about 0.5 mm or less, about 45% by weight of sawdust having about 40 to about 50% moisture content and a particle size of about 0.5 mm×5 mm, and about 10% by weight of sodium silicate liquid to form a mixture;

extruding the mixture;

compression molding the mixture with a press: and curing the molded mixture.

2. The method of manufacturing an ocherous panel of claim 1 wherein said mixture is mixed in a vertical mixer.

3. The method of manufacturing an ocherous panel of claim 1 wherein said mixture is extruded through a pug mill.

4. The method of manufacturing an ocherous panel of claim 1 wherein both sides of said press are heated to a temperature of about 200 to about 500° C.

5. The method of manufacturing an ocherous panel of claim 1 wherein said mixture is cured for about 2 or 3 seconds.

6. A method of manufacturing an ocherous panel for use as an interior building material comprising the steps of:

mixing about 45% by weight of ocher particles having about 40 to about 50% moisture content and a particle size of about 0.5 mm or less, about 45% by weight of sawdust having about 40 to about 50% moisture content and a particle size of about 0.5 mm×5 mm, and about 10% by weight of sodium silicate liquid to form a mixture;

extruding the mixture;

compression molding the mixture with a press, one side of the press being heated to a temperature of 200 to 500° C.; and vitrifying the other non-heated side of the panel.

7. The method of manufacturing an ocherous panel of claim 6 wherein said mixture is mixed in a vertical mixer.

8. The method of manufacturing an ocherous panel of claim 6 wherein said mixture is extruded through a pug mill.

9. The method of manufacturing an ocherous panel of claim 6 wherein said mixture is cured for about 2 or 3 seconds.

* * * * *